United States Patent
Yu et al.

(10) Patent No.: US 8,983,179 B1
(45) Date of Patent: Mar. 17, 2015

(54) SYSTEM AND METHOD FOR PERFORMING SUPERVISED OBJECT SEGMENTATION ON IMAGES

(75) Inventors: Tianli Yu, San Mateo, CA (US); Luca Bertelli, Foster City, CA (US); Salih Burak Gokturk, Zurich (CH); Muralidharan Venkatasubramanian, Mountain View, CA (US); Diem Vu, San Jose, CA (US)

(73) Assignee: Google Inc., Mountain View, CA (US)

( * ) Notice: Subject to any disclaimer, the term of this patent is extended or adjusted under 35 U.S.C. 154(b) by 479 days.

(21) Appl. No.: 13/294,133

(22) Filed: Nov. 10, 2011

Related U.S. Application Data (60) Provisional application No. 61/412,368, filed on Nov. 10, 2010.

(51) Int. Cl.
*G06K 9/00* (2006.01)
(52) U.S. Cl.
USPC .............................. 382/159; 700/47
(58) Field of Classification Search
CPC ..... G06K 9/6256; G06K 9/66; G06K 9/6217; G06F 7/764
USPC .................. 382/111, 159; 700/47–48; 706/20
See application file for complete search history.

(56) References Cited

U.S. PATENT DOCUMENTS

| | | | |
|---|---|---|---|
| 5,528,703 A | 6/1996 | Lee | |
| 6,775,399 B1 | 8/2004 | Jiang | |
| 8,023,699 B2 * | 9/2011 | Namgoong | 382/115 |
| 8,154,633 B2 | 4/2012 | Gloudemans et al. | |
| 8,335,374 B2 | 12/2012 | Boardman | |
| 8,385,609 B2 | 2/2013 | Piramuthu et al. | |
| 8,422,775 B2 | 4/2013 | Wang et al. | |
| 8,675,933 B2 | 3/2014 | Wehnes et al. | |
| 2005/0002555 A1 * | 1/2005 | Kumiya et al. | 382/153 |
| 2007/0223785 A1 * | 9/2007 | Sano | 382/103 |
| 2008/0082426 A1 * | 4/2008 | Gokturk et al. | 705/27 |
| 2008/0253622 A1 * | 10/2008 | Tosa et al. | 382/117 |
| 2010/0195899 A1 * | 8/2010 | Nc et al. | 382/154 |

FOREIGN PATENT DOCUMENTS

GB 2467643 A * 8/2010

* cited by examiner

*Primary Examiner* — Shefali Goradia
(74) *Attorney, Agent, or Firm* — Fish & Richardson P.C.

(57) ABSTRACT

Each training image in a collection of training images is associated with a corresponding mask. A set of training images is selected from the collection as being a match for an input image, based at least in part on a comparison of the input image to each training image in the collection. An output mask is determined from the associated masks of the set of training images. One or more boundaries are determined for an object depicted in the input image using the output mask.

26 Claims, 6 Drawing Sheets

SYSTEM AND METHOD FOR PERFORMING SUPERVISED OBJECT SEGMENTATION ON IMAGES

RELATED APPLICATIONS

This application claims benefit of priority to provisional U.S. Patent Application No. 61/412,368, filed Nov. 10, 2010; the aforementioned priority application is hereby incorporated by reference in its entirety.

TECHNICAL FIELD

The disclosed embodiments relate generally to a system and method for performing supervised object segmentation on images.

BACKGROUND

The field of computer vision includes topics such as object recognition and image retrieval by similarity. State of the art methodology in these topics has steadily improved with improvements in object/ground segregation. Object/Ground segregation, sometimes referred to generically as "segmentation," is the problem of segmenting an image into a foreground and background, where the foreground contains an object of interest that belongs to one or more object classes.

Many approaches to segmentation can be characterized as "bottom-up segmentation". In these approaches, the segmentation is performed using low-level features, such as pixel data.

DETAILED DESCRIPTION

Embodiments described herein utilize high-level image information to perform segmentation on images. In particular, embodiments described herein recognize that segmentation can exploit high-level, prior knowledge as determined from object class recognition and structured learning.

Furthermore, embodiments described herein recognize that object instances of the same class share several discriminative high-level cues, such as shape, and that such cues can be highly probative in segmenting an image into portions that depict a foreground object apart from a remainder or background of the image.

At least some embodiments described herein enable efficient and accurate segmentation of input images that contain an object of a designated class. Structured learning techniques, such as used with structured Support Vector Machines (SVM) may be also used to identify and tune a training set that includes training images and masks.

In some embodiments, a segmentation process is performed on an image using specific non-linear kernels that incorporate top-down object-class cues. A comparison engine such as described may also take into account potential inter-class variations by leveraging object/image similarity notions.

According to some embodiments, a system and method are provided for segmenting an image into portions that depict an object or foreground from a remainder of the image. In an embodiment, each training image in a collection of training images is associated with a corresponding mask. A set of training images is selected from the collection as being a match for an input image, based at least in part on a comparison of the input image to each training image in the collection. An output mask is determined from the associated masks of the set of training images. One or more boundaries are determined for an object depicted in the input image using the output mask.

Still further, one or more embodiments enable selection of a set of training images for a particular class of objects. The training images are selected for the training set based at least in part on a set of visual features that are known to be characteristics of individual objects of the particular class. Each training image in the set of training images is associated with a mask that is derived from that training image. A comparison score is determined as between an input image and individual images that comprise the set of training images. At least one of the set of training images is selected as being a best match for the input image based on the comparison score. An object is identified of the particular class from the input image using the mask associated with the selected one of the training images.

Terminology

As used herein, the term "image data" is intended to mean data that corresponds to or is based on discrete portions of a captured image. For example, with digital images, such as those provided in a Joint Photographic Experts Group (JPEG) format, the image data may correspond to data or information about pixels that form the image, or data or information determined from pixels of the image. Another example of "image data" is signature or other non-textual data that represents a classification or identity of an object, as well as a global or local feature.

The terms "recognize", or "recognition", or variants thereof, in the context of an image or image data, e.g., "recognize an image," means a determination as to what the image correlates to, represents, identifies, means, and/or a context provided by the image. Recognition does not necessarily mean a determination of identity, such as a name, unless stated so expressly.

A "mask" refers to a derived image that depicts an object of interest separate from a remainder or background of the image. Generally, a mask is determined by associating each pixel of an image with a binary value that represents one of either the object of interest or the background.

As used herein, the terms "programmatic", "programmatically" or variations thereof mean by way of execution of code, programming or other logic. A programmatic action may be performed with software, firmware or hardware, and generally without user-intervention, albeit not necessarily automatically, as the action may be manually triggered or require manual interaction.

One or more embodiments described herein may be implemented using programmatic elements, often referred to as modules or components, although other names may be used. Such programmatic elements may include a program, a subroutine, a portion of a program, a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of a system provided for in this application may require use of memory, processors and network resources, including data ports and signal lines, unless stated otherwise.

Embodiments described herein generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular telephony/messaging devices, tablets or laptop computers. Thus, memory, processing and network resources may all be used in connection with the establishment, use or performance of any embodiment described herein, including with the performance of any method or with the implementation of any system.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include a processor, or processors, and various forms of memory for holding data and instructions. Examples of computer-readable mediums include permanent memory storage devices, such as hard drives on personal computers or servers. Other examples of computer storage mediums include portable storage units, such as CD or DVD units, flash memory, such as carried on many cell phones and portable devices, and magnetic memory. Computers, terminals, network enabled devices, e.g., mobile devices such as cell phones, are all examples of machines and devices that utilize processors, memory, and instructions stored on computer-readable mediums.

Overview

Figure 1:
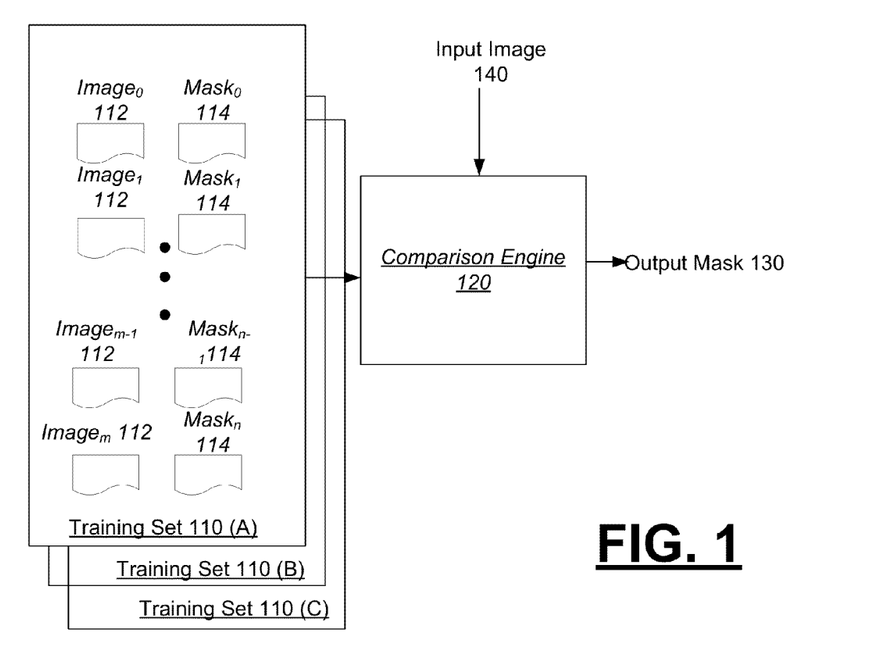
FIG. 1 illustrates a comparison engine for selecting an optimal mask for performing segmentation of a depicted object in a given image, according to one or more embodiments.

FIG. 1 illustrates a comparison engine for performing segmentation of an image depicting an object, according to one or more embodiments. A comparison engine 120 such as shown in FIG. 1 is configured to use top-down information to select an optimal mask for segmenting an object from a remainder of an image.

In more detail, comparison engine 120 is adapted to utilize a training set 110 of relevant training images to segment input images into portions that correspond to an object depicted in a foreground apart from a background or remainder of the input image. The training images that are included in the training set 110 may be selected to be specific to a defined domain, such as to a category or class of objects. For example, the training set 110 can be selected for a domain that corresponds to "women's clothing," "apparel" or "men's clothing" or other merchandise items. Still further, the training set 110 may include training images that are more specific to a domain or product class, so as to be more relevant to the objects in a particular domain or product class that are to be identified and segmented from input images. For example, the training set images may be specific to a type of women's clothing, e.g., women's dresses, men's shoes, sporting goods etc. Accordingly, some embodiments provide for the use of multiple training sets 110-shown in FIG. 1 as training set 110 (A), training set 110 (B), and training set 110 (C). The comparison engine 120, or another programmatic component, may select the training set 110 based on the object classification. The object classification may be determined from, for example, operator input, metadata such as a Uniform Resource Locator (URL) or metadata associated with an individual input image or collection of input images that are to be segmented, information known about the source of the input image such as an online product catalog for specific types of clothing, and/or text accompanying the input image, such as a caption or product description. As an addition or alternative, the training images that are included in the training set may be of a more general class of objects that are expected to have specific visual facets. Accordingly, embodiments provide that the training set 110 includes training images of objects that collectively provide visual features and facets that are expected to be depicted in input images under analysis.

In an embodiment, each training set 110 includes multiple image mask pairs (Mi,Ii), each of which includes a training image 112, and a corresponding mask 114 for an object depicted in the training image 112. Each mask 114 may be derived from the corresponding training image 112, and includes features such as shape, local features, and global features. In an embodiment, the comparison engine 120 uses a selected or predetermined training set 110 in order to determine or compute an output mask 130. The output mask 130 can be used to segment an input image 140, resulting in the determination of a shape or boundary for an object depicted in the input image 140. In one implementation, the output mask 130 corresponds to one of the masks 114 of the training set 110, and its selection is based on a determination that one training image 112 of the training set 110 is a best match for an input image 140 as compared to other training images of the training set 110. In other implementations, the output mask 130 is computed from a subset of masks 114 in the training set 110, based on a determination that multiple training images 112 in the training set 110 are sufficiently similar to the input image 140.

In one embodiment, the comparison engine 120 determines the output mask 130 by performing a series of comparison functions between the input image 140 and individual training images 112 of the training set 110. The comparison functions are designed to generate a comparison score that indicates how well the input image 140, or at least the portion of the input image 140 that depicts an object, matches to an individual training image 112 of the training set 110. As described by, for example, an embodiment of FIG. 2, the comparison engine 120 utilizes a structure that employs multiple kernels, also referred to as a kernel library, including kernels that account for objects shapes, visual facets of an image, and image similarity, in determining a comparison score between individual training images 112 of the training set 110 and the input image 140. The individual kernels can be adapted or selected for a particular domain or object classification, such as, for example, women's dresses, men's shoes etc. As such, the comparison engine 120 can utilize kernels that are domain-specific.

For the given input image 140, comparison engine 120 is configured to determine a set of one or more individual training images 112 that have the highest comparison scores. In some embodiments, the comparison score is determined using multiple kernels or a kernel library, such as described with reference to FIG. 2. The output mask 130 is selected or computed based on the corresponding mask(s) 114 for the training images 112 in the training set 110.

Figure 2:
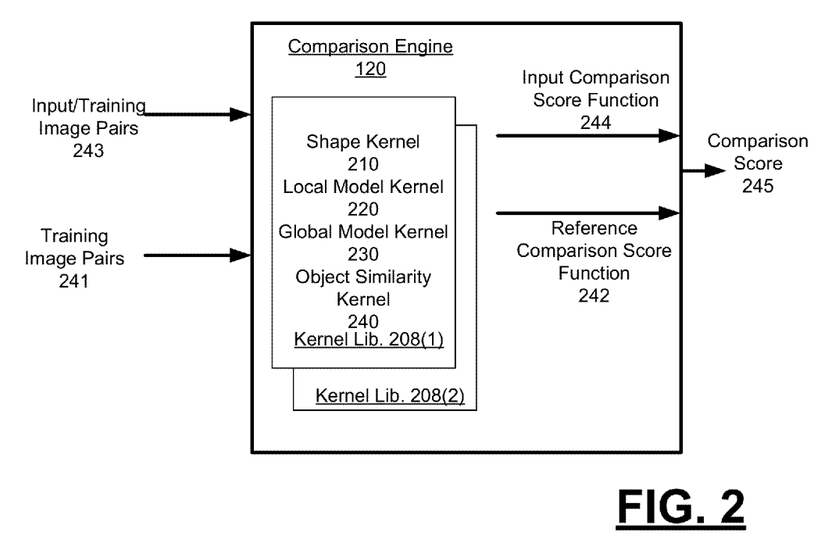
FIG. 2 is a block diagram description of the comparison engine, according to one or more embodiments.

FIG. 2 illustrates a comparison engine that is configured to perform segmentation using a kernel library, according to one or more embodiments. In an embodiment, comparison engine 120 is adapted to use segmentation specific nonlinear kernels. Each kernel provides a set of functions that can be used to define a similarity as between two or more image/mask pairs based on a specific facet of comparison, such as shape. In some implementations, the comparison engine 120 can be implemented for purpose of segmenting objects of different domains and classifications. Accordingly, the comparison engine 120 may utilize a kernel library 208 and training set 110, as shown in FIG. 1, that is domain or object class specific. More specifically, embodiments provide that the comparison engine 120 implements a combination of kernels and image similarity functions in determining which training images 112 of the training set 110 in FIG. 1 are a best match for a particular input image. A set of one or more training images 112 can be identified, and the corresponding masks 114 for each of the training images 112 in the set can be used to select or compute the output mask 130 for segmenting an object of interest from an input image 140. In this way, the comparison engine 120 incorporates top-down object class cues that can also take into account potential interclass variations using object-image similarity notions.

According to embodiments, multiple kernel libraries 208 (1), 208(2) may be available to the comparison engine 120. Furthermore, each kernel library 208 may include a set of kernels that are selected and adapted for a particular object class or domain. Thus, both the selection of kernels that include a particular kernel library 208, as well as the configuration of the individual kernels, can be specific to an object class or domain.

In one embodiment, the comparison engine 120 includes a shape kernel 210, a local model kernel 220, a global model kernel 230, and an image similarity function 240. The kernels may be selected or otherwise adapted for a particular domain or object class. Additional or alternative sets of kernels may also be used, containing more or a fewer number of kernels.

In one implementation, the comparison engine 120 determines a comparison score 245 that is based on an input comparison score function 244 and a reference comparison score function 242. The reference comparison score function 242 may be based on the training images 112 (see FIG. 1) that are included in the training set 110 (see FIG. 1). In one implementation, the reference comparison score function 242 is determined from pairing individual training images 112 that are included in the training set 110. More specifically, the reference comparison score function 242 can be determined by performing comparison score operations on the identified pairings between individual training images 112 in the training set 110, referred to as training image pairs 241. The training image pairs 241 may correspond to, for example, all, or substantially all, possible pairings amongst the training images 112 that are included in the training set 110.

In an embodiment, the kernel library 208 includes shape kernel 210, which can be implemented to obtain a measurement of a degree of similarity or agreement as between two masks, provided that there is a good match between the corresponding training images of the two masks that are being compared. In some implementations, the shape kernel 210 can be implemented using equation (1), provided below.

Denoting with $y_{ip}$ the value of the first mask $y_i$ at position p, $y_{jp}$ the value of the second mask $y_j$ at position p and assuming $y_{ip}$ and $y_{jp}$ are each a binary random variable, the shape kernel 210 can be represented as:

$$K_S = \frac{1}{P}\sum_{p=1}^{P}(y_{ip}y_{jp} + (1-y_{ip})(1-y_{jp}))  \quad \text{Eqn. (1)}$$

Where P is the total number of pixels in an image.

The kernel library 208 may also include local model kernel 220, which can be implemented, for example, as described with equations (2)-(6). The local model kernel 220 provides a measure of how well a new mask fits to a corresponding input image based on a model that is built using the input image and one or more of the training masks 114 from the training set 110, which are selected based on a similarity determination between the input image and the individual training images 112. The following equation may be used to represent the local model kernel 220:

$$h(x_p): \mathbb{R}^M \mapsto \{0,1\}^Q \quad \text{Eqn. (2)}$$

The feature points map to binary vectors, where M is the dimension of the feature space and Q is the number of quantization cells.

$$F_i^j = \frac{\sum_{p=1}^{P}h(x_{ip})y_{jp}}{\sum_{p=1}^{P}y_{jp}} \quad \text{Eqn. (3)}$$

Equation (3) provides the histogram of a foreground or object computed on image $x_i$ using mask $y_j$. Similarly, the background histogram may be defined as:

$$B_i^j = \frac{\sum_{p=1}^{P}h(x_{ip})(1-y_{jp})}{\sum_{p=1}^{P}(1-y_{jp})} \quad \text{Eqn. (4)}$$

These models are built using the features from image i and the mask information from mask j. The local model kernel 220 expression may thus be represented as:

$$K_{LM} = 1/P\sum_{p=1}^{P}(F_i^{jT}h(x_{ip})y_{ip} + B_i^{jT}h(x_{ip})(1-y_{ip})) \quad \text{Eqn. (5)}$$

Note that the kernel can be non-symmetric:

$$K((x_i,y_i),(x_j,y_j)) \neq K((x_j,y_j),(x_i,y_i)) \quad \text{Eqn. (6)}$$

The kernel library 208 may also include global model kernel 230, which can be constructed in similar fashion to the local model kernel 220, but measures how well each image/mask pair in the training set 110 fits a global model built using all training samples, such as described by equation (7). Denoting $F_G$ and $B_G$ as global foreground and background, the global model kernel 230 may be represented as:

$$K_{GM} = 1/P \sum_{p=1}^{P} ([F_G^T h(x_{ip}) y_{ip} + B_G^T h(x_{ip})(1-y_{ip})]$$

$$[F_G^T h(x_{ip}) y_{ip} + B_G^T h(x_{ip})(1-y_{ip})]) \quad \text{Eqn. (7)}$$

When the input image 140 is received, the mask can be assumed unknown. The input image 140 is paired to each training image 112 in the training set 110 (input/training pairs 243) to determine the input comparison score function 244. The input comparison score function 244 determines an overall comparison score, using the various kernels and or image similarity function, between the input image 140 and each of some or all of the training images 112 in the training set 110.

Resulting comparison scores are determined as between the input image 140 and individual training images 112 of the training set 110. Based on the comparison scores, a set of training images/mask pairs are determined for the input image 140. In an embodiment, the set includes one training image 112, and the mask 114 corresponding to that training image 112 is selected for purpose of segmenting the object in the input image 140.

In another embodiment, the comparison scores identify a subset of multiple training images 112, where each training image 112 satisfies a similarity score threshold with the input image 140. The masks 114 of the training images 112 in the subset are used to compute the output mask 130 for segmenting the input image 140 into a foreground or object and a background. More specifically, the output mask 130 can be computed from the individual masks 114 associated with the training images 112 that satisfy the similarity score threshold. The similarity score threshold may be based on design parameters, as well as optimization considerations that take into account the precision of the output mask 130. The computation of the output mask 130 can involve use of the kernels of the kernel library 208. In particular, an energy function (E) can be developed that incorporates the selected training images 112 in the set ($I_i$), the mask 114 corresponding to each selected training image ($M_i$), the kernels (K) of the kernel library 208, the input image ($I_{input}$), and the unknown or output mask (M).

$$E(I_i, M_i, K, I_{input}, M) \quad \text{Eqn. (9)}$$

The output mask 130 can be computed by maximizing or optimizing the energy function (E) with respect to the mask (M) of the input image.

$$M^* = \mathrm{argmax}(I_i, M_i, K, I_{input}, M) \quad \text{Eqn. (10)}$$

The use of the object similarity kernel 240 by the comparison engine 120 can serve multiple purposes. In some embodiments, object similarity kernel 240 is configured to identify with minimal (or limited) computational resources those training image pairs that are comparable to the input image 140. Thus, those training images 112 that are relatively dissimilar to an input image 140 can, for example, be ignored from the more extensive kernel calculations. In some implementations, the use of image similarity operations on the training images 112 can limit selection to only pairs for which there is a good similarity measure between the training images 112 in the pair. When segmentation is performed, object similarity kernel 240 can limit the computation necessary to develop the comparison function, particularly when a large number of training images 112 are present. The comparison engine 120 may, for example, be determined only for those training images 112 that, on a relatively low granular level, are similar to the input image 140.

In one implementation, image similarity is constructed $\Lambda$ as a Gaussian kernel over the distance between feature vectors computed from two images in a pair:

$$\Lambda(x_1, x_2) = \exp\left(-\frac{\|\phi(x_1) - \phi(x_2)\|^2}{2\sigma^2}\right) \quad \text{Eqn. (8)}$$

Where $\phi: X \mapsto \mathbb{R}^n$ is a n-dimensional feature vector computed from the image content.

According to embodiments, a mask is determined for an input image 140 by first selecting a set of training image/mask pairs from the training set 110. The set of training image/mask pairs can be identified by applying the kernels of the kernel library to individual training images 112 in the training set 110. In one implementation, the set includes one training image/mask pair, which is used as the output mask.

Figure 3:
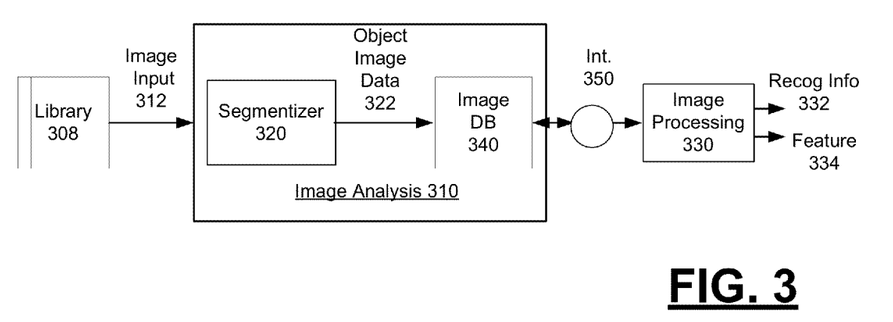
FIG. 3 illustrates a system in which an embodiment such as described with FIG. 1 and FIG. 2 can be implemented, according to one or more embodiments.

FIG. 3 illustrates a system in which an embodiment such as described with FIGS. 1 and 2 or elsewhere in this application can be implemented. In FIG. 3, an image analysis system 310 includes a segmentizer 320 and an image database 340. The image analysis system 310 receives input images 312 from a library 308, such as an online library CD-Rom, or aggregated online image source. The segmentizer 320 operates to segment an image input 312 into a foreground containing an object image and a background. Accordingly, the segmentizer 320 may be configured to implement a comparison engine, such as described with embodiments of FIG. 1 or FIG. 2, in order to determine the boundaries of the object that is to be the foreground. In an embodiment, the segmentizer 320 extracts the object image from the image input 312 using processes and functionality such as described with the comparison engine 120 of FIG. 1 and FIG. 2. Resulting object image data 322 can be stored in the image database 340.

Numerous applications may be performed utilizing the object image data 322 stored in the image database 340. An interface 350 can provide access to the object image data 322. In some embodiments, an interface 350 can be provided to enable programmatic access to the image database 340. The interface 350 can enable other services and applications to access the object image data 322. In one embodiment, interface 350 can be provided in connection with, for example, either a programmatic or human search interface that visually matches objects, as depicted in the image input 312 to an input query or criteria.

In one embodiment, image processing 330 performs recognition operations on the object image data 322 to determine recognition information 332 about the object image represented by the object image data 322. The recognition information 332 may identify, for example, a feature vector or signature that represents visual features of the object image, including color, pattern and shape information. The recognition operation, as well as other analysis operations, can benefit in that the object image is more reliably identified using top-down segmentation rather than, for example, using conventional bottom-up segmentation.

Among other uses, the recognition information 332 can distinguish an analyzed image from other images that depict objects of the same class. Alternatively, the recognition information 332 can be used to identify similar images depicting objects of the same class. Still further, the recognition information 332 can be associated with source content, e.g., a web resource, and used to enable subsequent functionality in connection with the rendering or use of the source content.

As an alternative or addition to recognition, image processing 330 may also perform operations of feature extraction in order to determine features 334. Feature extraction can identify, for example, features such as color, pattern and texture of an object depicted in an analyzed image. Feature extraction operations can be used to enable manual alterations to a depicted color of an object, e.g., allow a user to change color of a red dress to blue.

Methodology

Figure 4:
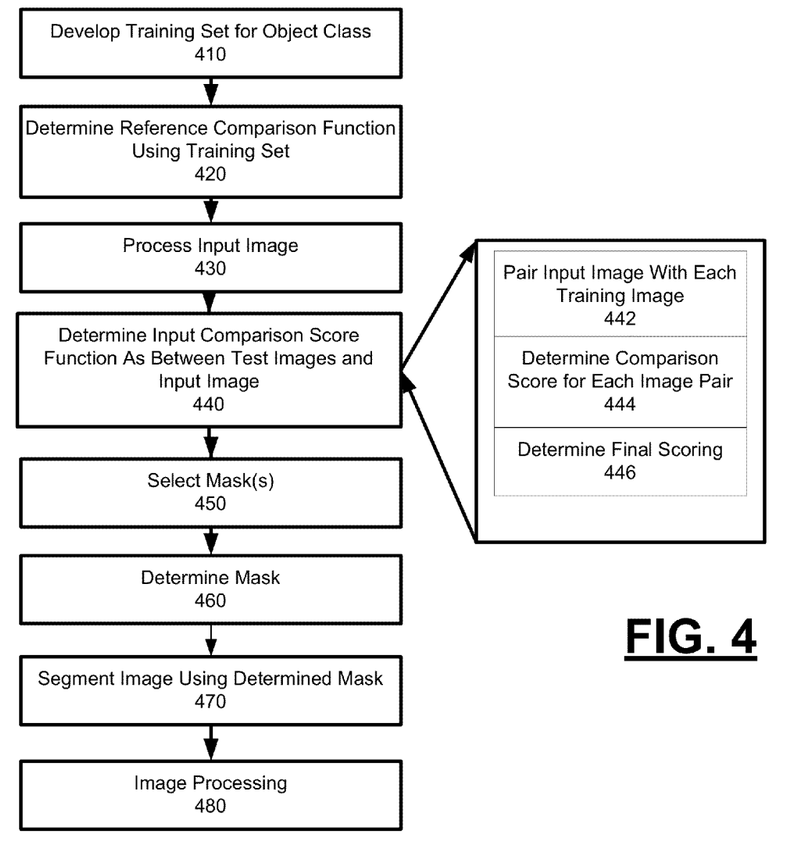
FIG. 4 illustrates a method for selecting a mask to perform segmentation on an input image, according to one or more embodiments.

FIG. 4 illustrates a method for selecting a mask to perform segmentation on an input image, according to one or more embodiments. A method such as described may reference elements of FIG. 1 or FIG. 2 for purpose of illustrating a suitable element for use in performing a step or sub-step being described. Accordingly, reference made to elements of other figures is for illustrative purposes.

A training set is developed for a particular object class or application (410). The training set may be specific to, for example, a domain or object classification. The training set 110 may provide training images 112 and a representative sample of masks 114 corresponding to the training images 112 for a particular domain or class of objects. The domain or object classification may also take into account a context or use of images. For example, the training set 110 may identify a specific class of objects in the context of an e-commerce service or application. Alternatively, the training set 110 may identify nature images, such as animals, or objects for other projects.

The reference comparison score function 242 can be determined from training images 112 of the training set 110 (420). The reference comparison score function 242 includes comparison scores generated based on comparisons between individual training images 112 of the training set 110, so that each image pair in the training set 110 has an associated comparison score.

An input image is processed (430). The input image 140 may originate from a variety of sources, such as, for example, (i) an online database such as a product catalog, (ii) an aggregated collection, e.g., crawler aggregates image content from sources on the Internet, (iii) published content, and/or (iv) user input. Furthermore, numerous applications can be implemented with embodiments such as described. In one embodiment, two-dimensional images of relatively low resolution and structure are processed. Such images may be aggregated from, for example, an eclectic or diverse range of sources. In e-commerce applications, for example, images may be procured from online product catalogs such as those that depict clothing and apparel. In other applications or context, images are aggregated from other libraries. Some embodiments process images that are known or expected to depict objects of a particular class, such as horses or women's dresses.

Similarly, the input comparison score function 244 is determined to carry comparison scores between the input image 140 and each training image 112 in the training set 110 (440). In determining the input comparison score function 244, the input image 140 is paired with each individual training image in a training set (442). Object similarity functions may be used to select which training images 112 are used (or not used) for the comparison. The score of individual pairings (between the input image and a individual training image) is determined (444) and used for the input comparison score function 242. A final scoring function is determined to identify how the input image 140 scores in comparison to the training images 112 of the training set (446). The function can be used to select one or more masks (450), based on identifying one or more corresponding training images 112 that are a best match to the input image 140. In some embodiments, multiple training images 112 may be identified as a best match.

An output mask can be determined for the input image (460). In one implementation, the output mask 130 is computed from multiple masks that are identified as a result of (450). In another implementation, the output mask 130 is selected as being the mask that corresponds to the training image 112 that is the best match or most similar to the input image 140.

According to an embodiment, the input image 140 is segmented using the selected mask (470), resulting in the object or its boundaries being identified from the input image 140. Segmentation may be followed by other image processing operations, such as image recognition or feature extraction (480).

Figure 5:
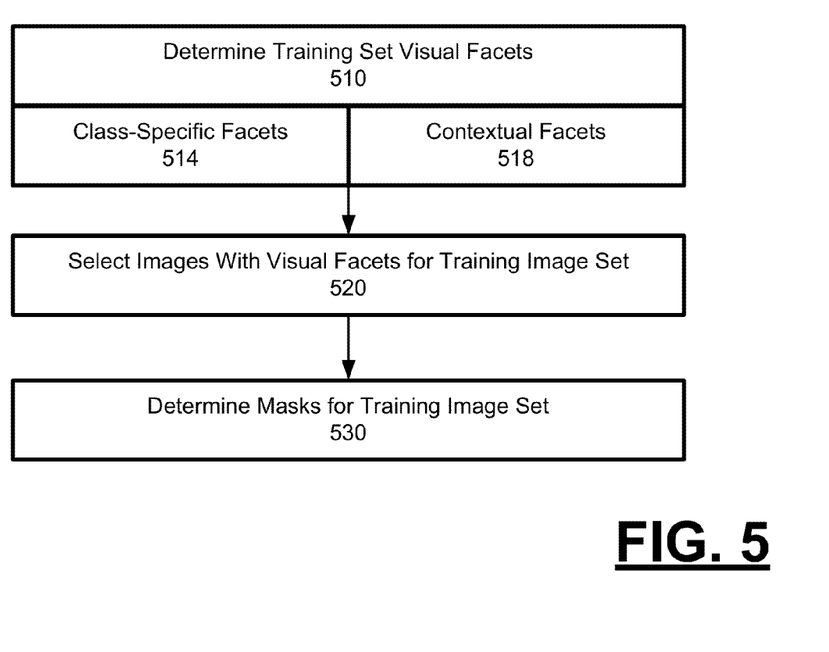
FIG. 5 illustrates a method for developing a training set that can be used for comparison operations, according to one or more embodiments.

FIG. 5 illustrates a method for developing a training set that can be used for comparison operations, according to one or more embodiments. A method such as described may reference elements of FIG. 1 or FIG. 2 for purpose of illustrating suitable element for use in performing a step or sub-step being described. Accordingly, reference made to elements of other figures is for purpose of illustration.

A training set is developed for a particular application (510) that specifies an object or object classes in context, e.g. e-commerce or nature. At least some training images 112 of the training set 110 may be selected as being representative of visual facets that are predicted or known historically from performing image analysis, such as segmentation and recognition, on images of a class that are specific to the application.

Visual facets include class-specific facets (514). Class-specific facets identify salient features of objects of an object class, such as woman's dresses or shoes. These features may be manually identified, based on knowledge and experience about the appearance of the object class. For example, with women's dresses, visual facets of women's dresses include various shapes of women's dresses, e.g., various lengths, bellbottoms, strapless. Training images 112 in the training set 110 may be selected to represent one or more of the individual object-specific facets.

In addition to object-specific facets, contextual facets are also used in order to identify training images (518). Contextual facets identify context, environment, and other visual features of how the class of objects may be displayed, given the source or library, which can also be application specific. For women's dresses, for example, contextual facets include whether the image is being depicted as being worn on a person or without, as well as what the angle is for the dress. With horses, visual facets can include background classifications, patterns or colors known for horses, and common poses of horses in images.

Images containing the visual facets, including category and/or contextual facets, are then selected for use in the training set. As mentioned, the training images may be selected manually, by for example, experts in a field relevant to the class of objects.

Once training images for the training set are selected (520), a mask is determined for each of the training images of the training set (530). The combination of the selected training images and the corresponding masks make up the training set.

Given a training set composed of image/mask pairs, embodiments develop a segmentation model using a structured Support Vector Machine (SVM) framework that is kernalized, based on kernels such as described with FIG. 2. Structured SVM is based on the principles of SVM. As known in the art, SVM is a classifier that is trained to make a specific decision, such as whether an image contains a horse or a dog. The output of SVM is generally a binary result. In contrast, structured SVM can output structured values, that include variables that have relationships to one another. As with regular SVM, structured SVM makes decisions, but the output has a structure, such as in the form of a lattice or list. In the case of segmentation, regular SVM makes decisions for individual pixels independently of all other pixels. In contrast, structured SVM makes a decision as to whether individual pixels of an image are part of the foreground or background, but the decisions are global so as to affect many or all pixels of the image.

According to an embodiment, a structured SVM can be implemented to determine weights for a given segmentation model. Different models can be determined for different categories of images, as well as corresponding training sets. Each model may include weights for use in structured SVM, as well as weights that affect implementation of different kernels, and/or weights that value the results of different kernels.

Figure 6:
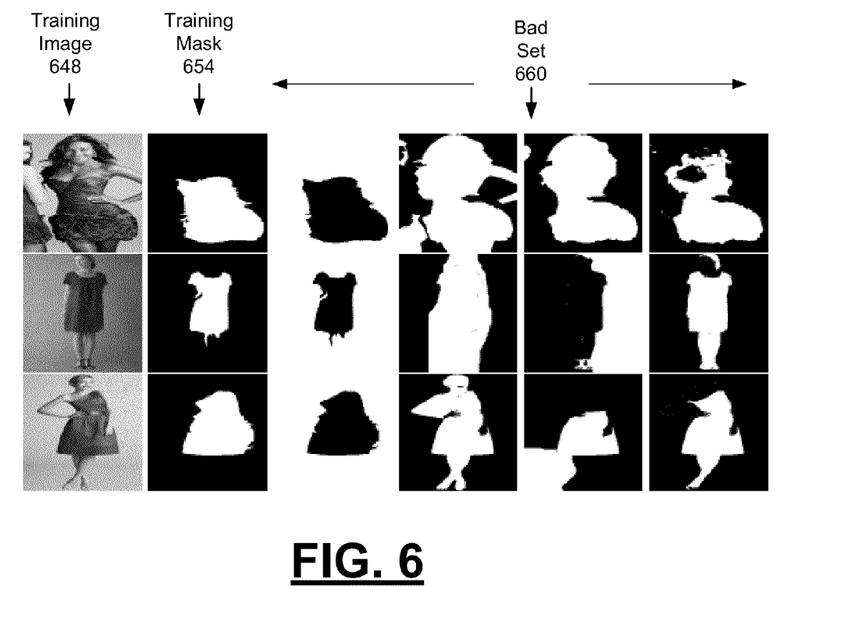
FIG. 6 illustrates how a training set of images and masks can be implemented, according to one or more embodiments.

FIG. 6 illustrates how a training set of images and masks can be implemented, according to an embodiment. In the example provided, the product class corresponds to women's clothes, or alternatively, a more specific categorization of women's dresses. An image training set is identified to be representative of images of women's dresses. Based on inspection, for example, a set of training images 648 may be selected which include, for example, images that depict dresses on models, dresses displayed without models, dresses on models with poses, slants in the depiction of the dress or person, and images that depict dresses of particular shapes and features. For each training image 648, a mask 654 is determined for the object depicted in the training image 648. In one embodiment, the mask 654 is selected based on a corresponding training image 648 for that mask 654 being a best match to an input image.

Additionally, some embodiments provide for a given training set to include images that depict most violated constraints for a particular mask, referred to as a "bad set" 660. The bad set 660 can be determined through, for example, implementation of the model, where constraints are violated to generate a bad mask for a training image/mask pair. In one implementation, the comparison between the input image and the bad set of masks for a given training image may be used to weight the determination as to whether a particular training image/mask is a best match. In particular, a relatively high comparison score for an input image as compared to the bad masks or set may be used to weight against the determination that the particular training image/mask is a best match for the input image. In that same example, similar weighting may also be applied to other training images that are similar to the training image containing the bad set with the high comparison score to the input image.

Hardware System Description

Figure 7:
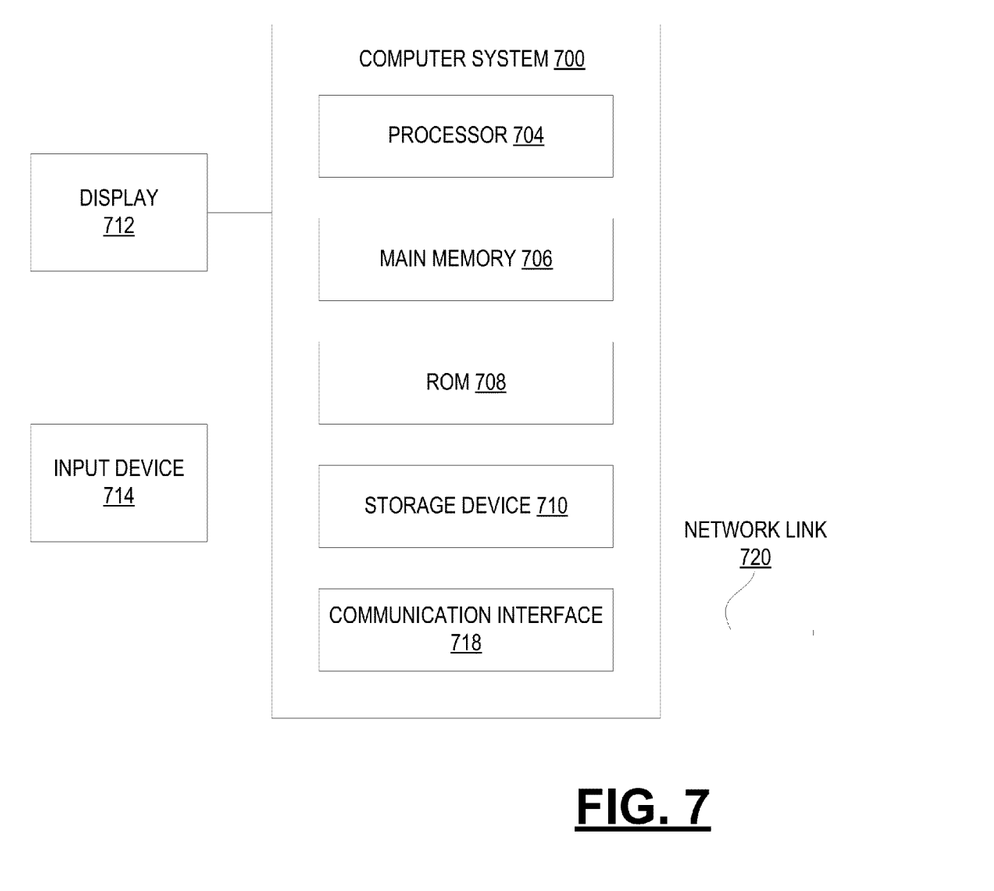
FIG. 7 is a block diagram that illustrates a computer system upon which embodiments described herein may be implemented.

FIG. 7 is a block diagram that illustrates a computer system upon which embodiments described herein may be implemented. For example, in the context of a system such as described by FIG. 3, may be implemented using a computer system such as described by FIG. 7.

In an embodiment, computer system 700 includes processor 704, main memory 706, ROM 708, storage device 710, and communication interface 718. Computer system 700 includes at least one processor 704 for processing information. Computer system 700 also includes a main memory 706, such as a random access memory (RAM) or other dynamic storage device, for storing information and instructions to be executed by processor 704. Main memory 706 also may be used for storing temporary variables or other intermediate information during execution of instructions to be executed by processor 704. Computer system 700 may also include a read only memory (ROM) 708 or other static storage device for storing static information and instructions for processor 704. A storage device 710, such as a magnetic disk or optical disk, is provided for storing information and instructions. The communication interface 718 may enable the computer system 700 to communicate with one or more networks through use of the network link 720.

Computer system 700 can include display 712, such as a cathode ray tube (CRT), a LCD monitor, and a television set, for displaying information to a user. An input device 714, including alphanumeric and other keys, is coupled to computer system 700 for communicating information and command selections to processor 704. Other non-limiting, illustrative examples of input device 714 include a mouse, a trackball, or cursor direction keys for communicating direction information and command selections to processor 704 and for controlling cursor movement on display 712. While only one input device 714 is depicted in FIG. 7, embodiments may include any number of input devices 714 coupled to computer system 700.

Embodiments described herein are related to the use of computer system 700 for implementing the techniques described herein. According to one embodiment, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement embodiments described herein. Thus, embodiments described are not limited to any specific combination of hardware circuitry and software.

CONCLUSION

Although illustrative embodiments have been described in detail herein with reference to the accompanying drawings, it is to be understood that the embodiments described are not limited to specific examples recited. As such, many modifications and variations are possible, including the matching of features described with one embodiment to another embodiment that makes no reference to such feature. Moreover, a particular feature described either individually or as part of an embodiment can be combined with other individually described features, or parts of other embodiments, even if the other features and embodiments make no mention of the particular feature.

What is claimed is:

1. A method for analyzing images, the method being implemented by one or more processors and comprising:
    receiving an input image that depicts an object;
    obtaining a plurality of training images, wherein each training image is associated with a mask derived from that training image;
    determining a plurality of comparison scores between the input image and the training images, wherein each comparison score identifies how well a portion of the input image that depicts the object matches a portion of the respective training image;
    determining, from the comparison scores, one or more training images with highest respective comparison scores;
    determining an output mask from the one or more masks associated with the determined one or more training images; and applying the output mask to determine one or more boundaries of the object depicted in the input image.

2. The method of claim 1, wherein the output mask is a mask associated with a training image with a highest comparison score.

3. The method of claim 1, wherein determining a plurality of comparison scores comprises:
   determining a plurality of measures of similarity between respective masks of the input image and the plurality of training images using a shape kernel;
   determining a plurality of measures of how well a respective mask of the plurality of training images fits to the input image using a local model kernel;
   determining a plurality of measures of how well a respective mask of the plurality of training images fits to a global model kernel, wherein the global model kernel is determined from the plurality of training images; and
   determining the plurality of comparison scores using the plurality of measures of similarity, the plurality of measures of how well a respective mask of the plurality of training images fits to the input image, and the plurality of measures of how well a respective mask of the plurality of training images fits to a global model kernel.

4. The method of claim 1, wherein the one or more training images include a training image associated with a bad mask, and wherein identifying training images with respective comparison scores above a threshold comprises:
   determining that the training image associated with a bad mask has a comparison score above a threshold, and
   reducing a weighting of a determination that the training image associated with a bad mask is a best match for the input image.

5. The method of claim 1, wherein the plurality of training images include objects displayed in the training images specific to a particular class of objects.

6. The method of claim 5, wherein the particular class of objects corresponds to an item of clothing or apparel.

7. The method of claim 5, wherein determining the plurality of comparison scores includes using a set of kernels.

8. The method of claim 7, wherein the set of kernels is specific to the particular class of objects.

9. The method of claim 8, wherein the set of kernels comprises a shape kernel, a local model kernel, and a global model kernel.

10. The method of claim 1, wherein obtaining a plurality of training images comprises:
    determining training images that include objects displayed in the training images specific to a particular class of objects.

11. The method of claim 1, further comprising determining a model for a particular class of objects using a kernalized structured Support Vector Machine, and wherein determining one or more boundaries of the object includes using the model for the particular class of the object.

12. The method of claim 1, wherein determining a plurality of comparison scores between the input image and the training images comprises:
    determining a plurality of similarity scores between the input image and the plurality of training images;
    identifying training images with similarity scores above a threshold; and
    determining the plurality of comparison scores between the input image and the identified training images.

13. A system for analyzing images, the system comprising:
    a memory that stores instructions;
    one or more processors that execute the instructions, including instructions to:
      receive an input image that depicts an object;
      obtain a plurality of training images, wherein each training image is associated with a mask derived from that training image;
      determine a plurality of comparison scores between the input image and the training images, wherein each comparison score identifies how well a portion of the input image that depicts the object matches a portion of the respective training image;
      determine, from the comparison scores, one or more training images with highest respective comparison scores;
      determine an output mask from the one or more masks associated with the determined one or more training images; and
      applying the output mask to determine one or more boundaries of the object depicted in the input image.

14. The system of claim 13, wherein the output mask is a mask associated with a training image with a highest comparison score.

15. The system of claim 13, wherein the instructions to determine a plurality of comparison scores includes instructions to:
    determine a plurality of measures of similarity between respective masks of the input image and the plurality of training images using a shape kernel;
    determine a plurality of measures of how well a respective mask of the plurality of training images fits to the input image using a local model kernel;
    determine a plurality of measures of how well a respective mask of the plurality of training images fits to a global model kernel, wherein the global model kernel is determined from the plurality of training images; and
    determine the plurality of comparison scores using the plurality of measures of similarity, the plurality of measures of how well a respective mask of the plurality of training images fits to the input image, and the plurality of measures of how well a respective mask of the plurality of training images fits to a global model kernel.

16. The system of claim 13, wherein the one or more training images include a training image associated with a bad mask, and wherein the instructions to identify training images with respective comparison scores above a threshold comprises instructions to:
    determine that the training image associated with a bad mask has a comparison score above a threshold, and
    reduce a weighting of a determination that the training image associated with a bad mask is a best match for the input image.

17. The system of claim 13, wherein the plurality of training images include objects displayed in the training images specific to a particular class of objects.

18. The system of claim 17, wherein the particular class of object corresponds to an item of clothing or apparel.

19. The system of claim 17, wherein the instructions to determine a plurality of comparison scores includes instructions to use a set of kernels.

20. The system of claim 19, wherein the set of kernels is specific to the particular class of objects.

21. The system of claim 20, wherein the set of kernels comprises a shape kernel, a local model kernel, and a global model kernel.

22. The system of claim 13, wherein the instructions to obtain a plurality of training images include instructions to determine training images that include objects displayed in the training images specific to a particular class of objects.

23. The system of claim 13, wherein the instructions further include instructions to determine a model for a particular class of objects using a structured Support Vector Machine that is kernalized to develop a model for a particular class, and wherein the instructions to determine the one or more boundaries of the object include instructions to use the model for the particular class of the object.

24. The system of claim 13, wherein the instructions to determine a plurality of comparison scores between the input image and the training images include instructions to:
- determine a plurality of similarity scores between the input image and the plurality of training images;
- identify training images with similarity scores above a threshold; and
- determine the plurality of comparison scores between the input image and the identified training images.

25. A non-transitory computer readable medium that stores instructions, including instructions that when executed by one or more processors, cause the one or more processors to perform operations that comprise:
- receiving an input image that depicts an object;
- obtaining a plurality of training images, wherein each training image is associated with a mask derived from that training image;
- determining a plurality of comparison scores between the input image and the training images, wherein each comparison score identifies how well a portion of the input image that depicts the object matches a portion of the respective training image;
- determining, from the comparison scores, one or more training images with highest respective comparison scores;
- determining an output mask from the one or more masks associated with the determined one or more training images; and
- applying the output mask to determine one or more boundaries of the object depicted in the input image.

26. The computer readable medium of claim 25, wherein determining a plurality of comparison scores between the input image and the training images comprises:
- determining a plurality of similarity scores between the input image and the plurality of training images;
- identifying training images with similarity scores above a threshold; and
- determining the plurality of comparison scores between the input image and the identified training images.

* * * * *